US008499153B2

(12) United States Patent
Ritola et al.

(10) Patent No.: US 8,499,153 B2
(45) Date of Patent: Jul. 30, 2013

(54) SYSTEM AND METHOD OF AUTHENTICATING A USER TO A SERVICE PROVIDER

(75) Inventors: Timo Ritola, Oulu (FI); Mika Somero, Kempele (FI)

(73) Assignee: Nokia Corporation (FI)

( * ) Notice: Subject to any disclaimer, the term of this patent is extended or adjusted under 35 U.S.C. 154(b) by 1125 days.

(21) Appl. No.: 10/875,974

(22) Filed: Jun. 24, 2004

(65) Prior Publication Data

US 2005/0289341 A1 Dec. 29, 2005

(51) Int. Cl.
*H04L 9/32* (2006.01)

(52) U.S. Cl.
USPC ............................................. 713/168; 726/4

(58) Field of Classification Search
USPC .................... 713/150, 158, 164, 168
See application file for complete search history.

(56) References Cited

U.S. PATENT DOCUMENTS

| 6,421,768 | B1 | 7/2002 | Purpura | |
|---|---|---|---|---|
| 6,446,204 | B1 * | 9/2002 | Pang et al. | 713/153 |
| 7,117,266 | B2 * | 10/2006 | Fishman et al. | 709/228 |
| 7,188,240 | B1 * | 3/2007 | Berstis et al. | 713/100 |
| 2002/0180582 | A1 * | 12/2002 | Nielsen | 340/5.6 |
| 2003/0093690 | A1 * | 5/2003 | Kemper | 713/201 |
| 2003/0174839 | A1 * | 9/2003 | Yamagata et al. | 380/270 |
| 2004/0064687 | A1 | 4/2004 | Pfitzmann et al. | |
| 2006/0053296 | A1 * | 3/2006 | Busboom et al. | 713/182 |

FOREIGN PATENT DOCUMENTS

| WO | WO 03/049000 | | 6/2003 |
|---|---|---|---|
| WO | WO 03/065640 | A1 | 8/2003 |
| WO | WO 03/100544 | A2 | 12/2003 |

OTHER PUBLICATIONS

"Liberty Bindings and Profiles Specification," Version 1.1, Jan. 15, 2003, 74 pp, Liberty Alliance Project, Piscataway, NJ, USA.
First Office Action in Chinese Patent Application No. 200580028044.4, dated Oct. 16, 2009.
Office Action in Chinese Patent Application No. 200580028044.4, dated Jun. 17, 2011.
Chinese Patent Application No. 200580028044.4—Fourth Office Action dated Aug. 2, 2012.
Third Office Action in Chinese Patent Application No. 200580028044.4, dated Feb. 29, 2012 and English translation thereof.
Liberty Alliance Project, Liberty ID-FF Architecture Overview, Version 1.2, 2003, pp. 1-44.
Chinese Patent Application No. 200580028044.4—Rejection Decision dated Dec. 5, 2012.

* cited by examiner

*Primary Examiner* — Farid Homayounmehr
*Assistant Examiner* — Suman Debnath
(74) *Attorney, Agent, or Firm* — Banner & Witcoff, Ltd.

(57) ABSTRACT

A system, device, computer program product, and method provide authentication of a user to a service provider. The system includes a service provider, a terminal, and a network that allows communication between the service provider and the terminal. The terminal includes a memory, a communication interface, a processor, and an Identity Provider (IDP) application. The communication interface is configured to receive an authentication request from a service provider wherein the authentication request includes an acceptable identity provider and to send the authentication request to the acceptable identity provider if the acceptable identity provider matches a supported identity provider stored in the memory of the terminal. The processor is coupled to the communication interface and to the memory and executes the IDP application. The IDP application is configured to compare the acceptable identity provider with the supported identity provider stored in the memory.

17 Claims, 5 Drawing Sheets

SYSTEM AND METHOD OF AUTHENTICATING A USER TO A SERVICE PROVIDER

FIELD OF THE INVENTION

The present invention is related to a network identity architecture. More particularly, the present invention relates to a system and a method of providing single sign-on authentication of a user.

BACKGROUND OF THE INVENTION

The Liberty Alliance Project (LAP) was formed to develop open standards for federated network identity management and identity-based services and is working to support the privacy and security of identity information between businesses and individuals. The LAP does not develop products or services, but defines standards to which other organizations comply. The goal is to simplify transactions on the Internet, where user accounts are proliferating, by allowing users to link elements of their identity between accounts without centrally storing all of their personal information. The LAP specifications are oriented to the identification of a user to a service provider using an Identity Provider (IDP).

The LAP specification defines service providers as "an entity that provides services and/or goods to Principals." The LAP specification further defines principals as "an entity that can acquire a federated identity, that is capable of making decisions, and to which authenticated actions are done on its behalf. Examples of principals include an individual user, a group of individuals, a corporation, other legal entities, or a component of the Liberty architecture." In the LAP specification, an identity provider is defined as a "Liberty-enabled entity that creates, maintains, and manages identity information for Principals and provides Principal authentication to other service providers within a circle of trust". In the LAP specification, a Liberty-enabled client is defined as an "entity that has, or knows how to obtain, knowledge about the identity provider that the Principal wishes to use with the service provider." The Liberty Identity Federation Framework (ID-FF) architecture overview states "when users interact with services on the Internet, they often tailor the services in some way for their personal use. For example, a user may establish an account with a username and password and/or set some preferences for what information the user wants displayed and how the user wants it displayed. The network identity of each user is the overall global set of these attributes constituting the various accounts."

The user can have a single identity that enables a variety of services. Conversely, a user may have multiple identities that are used with different service providers. In the LAP specification, cookies are offered as a means for providing the appropriate identity to each service provider when required. Cookies are a message given to a Web browser by a Web server and are stored in a text file on a user's computer. The message is sent back to the Web server each time the Web browser requests a page from that Web server. International Application Number PCT/US02/38575 discloses use of cookies to provide the appropriate identity to each service provider. Cookies, however, may be either inadvertently or purposefully deleted. Additionally, cookies may or may not be allowed when browsing the Internet from some devices. Cookies also pose security issues. If session authentication information is cached in a persistent cookie (a cookie that is not deleted when the user logs out from the system), and a second user logs into the system and launches the browser, the second user can impersonate the first user through the cookies.

What is needed, therefore, is a more reliable and more secure method for easily providing the appropriate identity to each service provider. What is further needed is a method of automatically responding to an authentication request from a service provider without user intervention. What is still further needed is a method that allows a user to select the IDP that provides the authentication response to a service provider authentication request.

SUMMARY OF THE INVENTION

An exemplary embodiment of the invention relates to a method of authenticating a user to a service provider. The method includes receiving an authentication request from a service provider at a terminal using a network wherein the authentication request includes an acceptable identity provider; comparing, at the terminal, the acceptable identity provider with a supported identity provider stored in a memory of the terminal; and if the acceptable identity provider matches the supported identity provider, sending the authentication request from the terminal to the acceptable identity provider using the network. The memory may comprise a cache or a non-volatile memory. The supported identity provider may be a default identity provider. The method may further include storing the supported identity provider in a cache of the terminal and/or selecting a default identity provider.

An alternative exemplary embodiment of the invention also relates to a method of authenticating a user to a service provider. The method may include:
  receiving an authentication request from a service provider at a terminal using a network wherein the authentication request includes an acceptable identity provider,
  comparing, at the terminal, the acceptable identity provider with a supported identity provider stored in a memory of the terminal,
  if the acceptable identity provider matches the supported identity provider, displaying the acceptable identity provider to a user of the terminal,
  selecting the acceptable identity provider displayed to the user of the terminal,
  sending the authentication request from the terminal to the selected acceptable identity provider using the network,
  entering an access code before comparing the acceptable identity provider with the supported identity provider,
  if the acceptable identity provider does not match the supported identity provider, forwarding the authentication request to the acceptable identity provider from the terminal,
  if the authentication request is forwarded to the acceptable identity provider, receiving the authentication request at the acceptable identity provider,
  if the authentication request is received at the acceptable identity provider, authenticating the user at the acceptable identity provider,
  if the user is authenticated at the acceptable identity provider, creating an authentication response at the acceptable identity provider,
  if the authentication response is created at the acceptable identity provider, sending the authentication response to the terminal from the acceptable identity provider,
  if the authentication response is sent from the acceptable identity provider, receiving the authentication response at the terminal, if the authentication response is received, sending the authentication response from the terminal to the service provider using the network, and storing the acceptable identity provider in the memory of the terminal if the authentication response is received at the terminal.

Still another exemplary embodiment of the invention relates to a computer program product for authenticating a user to a service provider. The computer program product includes computer code configured to receive an authentication request from a service provider wherein the authentication request includes an acceptable identity provider, to compare the acceptable identity provider with a supported identity provider, and if the acceptable identity provider matches the supported identity provider, to send the authentication request to the acceptable identity provider. The computer program product may further be configured to store the supported identity provider in a cache and/or to allow a user to select a default identity provider. The supported identity provider may be a default identity provider.

Still another exemplary embodiment of the invention relates to a computer program product for authenticating a user to a service provider. The computer program product includes computer code configured to: receive an authentication request from a service provider wherein the authentication request includes an acceptable identity provider; to compare the acceptable identity provider with a supported identity provider; if the acceptable identity provider matches the supported identity provider, to display the acceptable identity provider to a user; to allow user selection of the acceptable identity provider displayed to the user; and to send the authentication request to the selected acceptable identity provider.

The supported identity provider may be a default identity provider. The computer code may further be configured to prompt the user for an access code before comparing the acceptable identity provider with the supported identity provider, to forward the authentication request to the acceptable identity provider if the acceptable identity provider does not match the supported identity provider, to receive the authentication response if an authentication response is sent from the acceptable identity provider, to send the authentication response to the service provider if the authentication response is received, and/or to store the acceptable identity provider in a memory if the authentication response is received.

Yet another exemplary embodiment of the invention relates to a device for authenticating a user to a service provider. The device includes a memory, a communication interface, a processor, and an IDP application. The communication interface is configured to receive an authentication request from a service provider wherein the authentication request includes an acceptable identity provider and to send the authentication request to the acceptable identity provider if the acceptable identity provider matches a supported identity provider stored in the memory. The processor is coupled to the communication interface and to the memory and executes the IDP application. The IDP application is configured to compare the acceptable identity provider with the supported identity provider stored in the memory. The memory may comprise a cache or a non-volatile memory. The supported identity provider may be a default identity provider.

The IDP application of the device may further be configured to store the supported identity provider in a cache, to allow a user to select a default identity provider, to display the acceptable identity provider to a user if the acceptable identity provider matches the supported identity provider, to allow a user to select the acceptable identity provider displayed to the user, to prompt the user for an access code before comparing the acceptable identity provider with the supported identity provider, to forward the authentication request to the acceptable identity provider if the acceptable identity provider does not match the supported identity provider, to receive the authentication response if an authentication response is sent from the acceptable identity provider, to send the authentication response to the service provider if the authentication response is received, and/or to store the acceptable identity provider in a memory if the authentication response is received.

Another exemplary embodiment of the invention relates to a system for authenticating a user to a service provider. The system includes a service provider, a terminal, and a network that allows communication between the service provider and the terminal. The terminal includes a memory, a communication interface, a processor, and an IDP application. The communication interface is configured to receive an authentication request from a service provider wherein the authentication request includes an acceptable identity provider and to send the authentication request to the acceptable identity provider if the acceptable identity provider matches a supported identity provider stored in the memory. The processor is coupled to the communication interface and to the memory and executes the IDP application. The IDP application is configured to compare the acceptable identity provider with the supported identity provider stored in the memory. The memory may comprise a cache or a non-volatile memory. The supported identity provider may be a default identity provider.

The IDP application of the device may further be configured to store the supported identity provider in a cache, to allow a user to select a default identity provider, to display the acceptable identity provider to a user if the acceptable identity provider matches the supported identity provider, to allow a user to select the acceptable identity provider displayed to the user, to prompt the user for an access code before comparing the acceptable identity provider with the supported identity provider, to forward the authentication request to the acceptable identity provider if the acceptable identity provider does not match the supported identity provider, to receive the authentication response if an authentication response is sent from the acceptable identity provider, to send the authentication response to the service provider if the authentication response is received, and/or to store the acceptable identity provider in a memory if the authentication response is received.

Other principal features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals will denote like elements.

DETAILED DESCRIPTION OF THE PREFERRED EMBODIMENTS

The term "terminal" should be understood to include, without limitation, cellular telephones, Personal Data Assistants (PDAs), such as those manufactured by PALM, Inc., Instant Messaging Devices (IMD), such as those manufactured by Blackberry, Inc., and other hand-held devices; notebook computers; laptop computers; desktop computers; mainframe computers; multi-processor systems; etc. A terminal may or may not be mobile.

Whether on impulse or planned, people should be able to use services and make purchases when and where they want, easily and conveniently. Electronic commerce frequently requires a substantial exchange of information in order to complete the transaction. These services and purchases generally require information from the user in order to initiate or complete the transaction. Repetitively entering this type of information is inconvenient and discourages the use of electronic commerce regardless of the type of terminal used. Mobile devices', in particular though, have limited input capabilities making the entering of the required information too time-consuming and cumbersome. Exemplary embodiments described herein provide a system, terminal, computer program product, and method to provide network identity information in a user-friendly manner.

To make life easier for users, terminals can store sensitive information including user identity information as required by various service providers. The information may be encrypted and protected with an access code that the user can define. Additionally, the terminals may respond either automatically or manually through user input to an identity authentication request received from a service provider. Additionally, the terminal compares acceptable identity providers as defined by the service provider to the supported identity providers already stored in the terminal so that the user will not select an identity provider that is either not supported by the user or not acceptable to the service provider.

Figure 1:
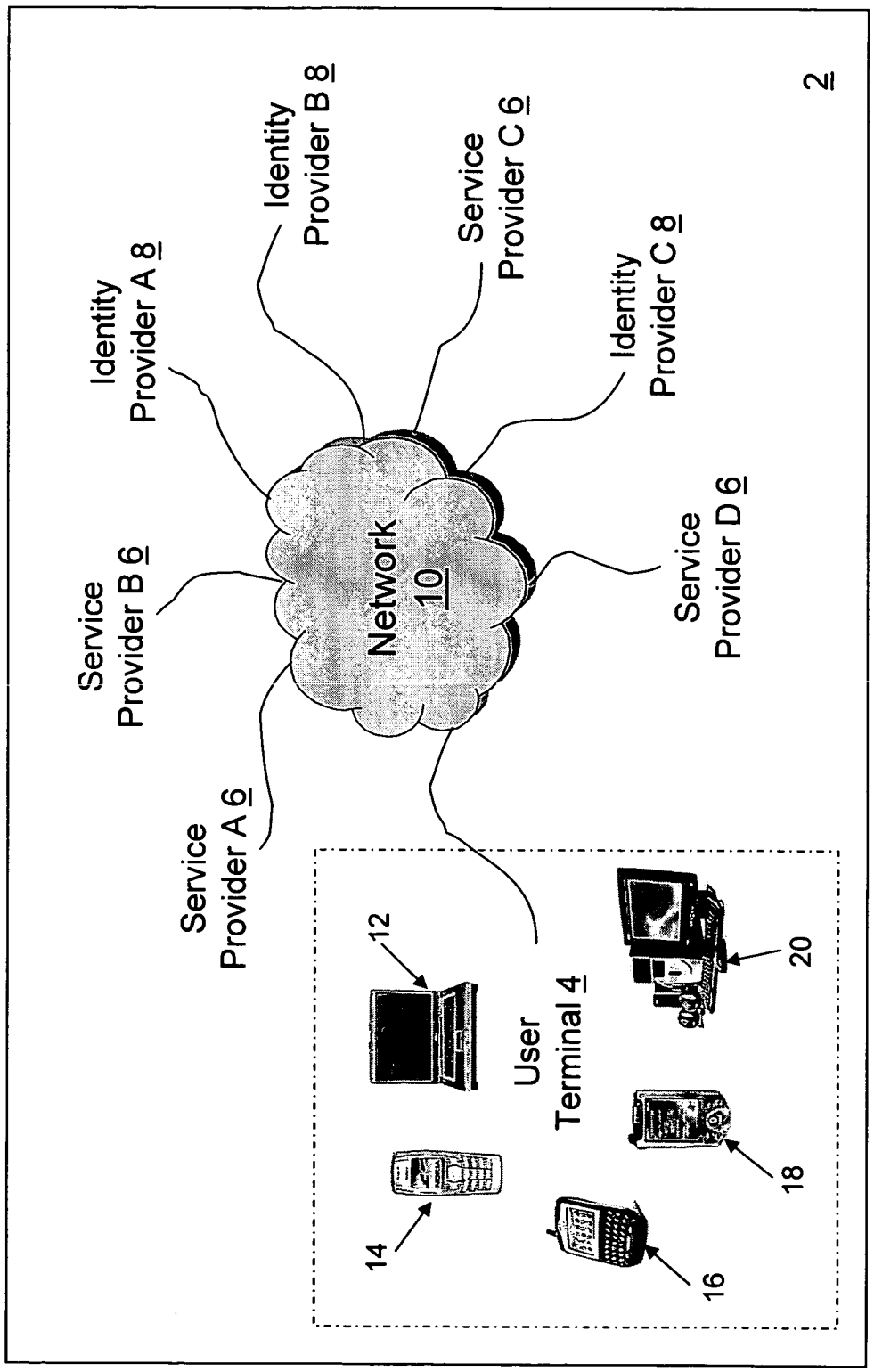
FIG. 1 is an overview diagram of a network identity system in accordance with an exemplary embodiment.

With reference to FIG. 1, the system 2 is comprised of a user terminal 4, multiple service providers 6, and multiple identity providers 8 that are connected through a network 10. The user terminal may include, but is not limited to, a notebook computer 12, a cellular telephone 14, an IMD 16, a PDA 18, a desktop computer 20, and the like. A mobile terminal may include, but is not limited to, a cellular telephone 14, a PDA 18, an IMD 16, and a notebook computer 12.

Figure 2:
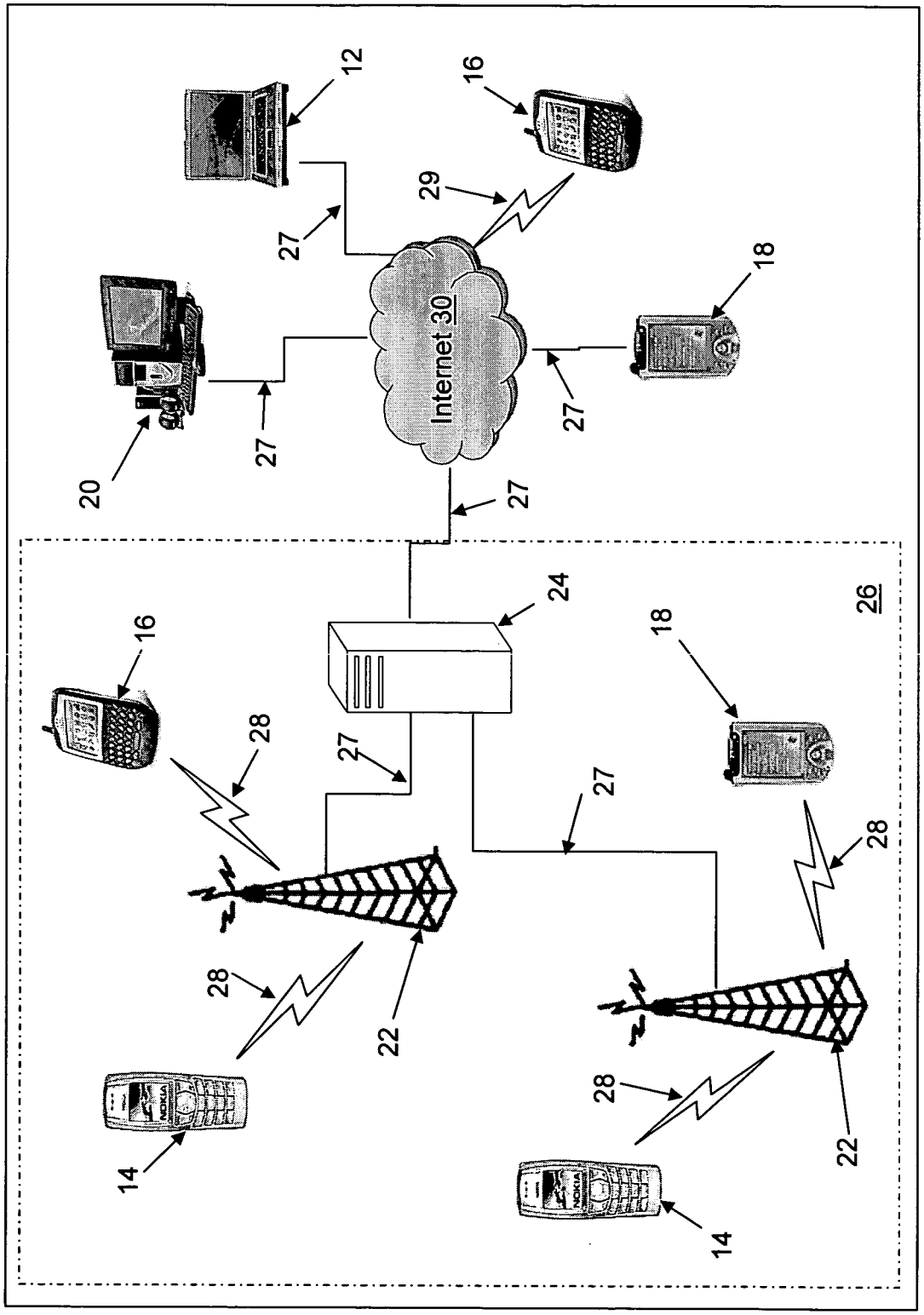
FIG. 2 is a network connectivity overview diagram in accordance with an exemplary embodiment.

With reference to FIG. 2, sample network connectivity methods are shown for various user terminals 4. The network 10 may include, but is not limited to, long range wireless connections 28, short range wireless connections 29, and land line connections 27. The land line connections 27 include, but are not limited to, telephone lines, cable lines, power lines, and the like. A terminal 4 may communicate using various transmission technologies including, but not limited to, Code Division Multiple Access, Global System for Mobile Communications, Universal Mobile Telecommunications System, Time Division Multiple Access, Transmission Control Protocol/Internet Protocol, Short Messaging Service, Multimedia Messaging Service, e-mail, Instant Messaging, Bluetooth, and the like. A terminal may communicate using various media including, but not limited to, radio, infrared, laser, cable connection, and the like. The network 10 may include, but is not limited to, a cellular telephone network 26 and the Internet 30. In the cellular telephone network 26, the mobile terminals may send and receive calls and messages and communicate with service providers 6 through the base station 22. The network server 24 allows communication between the mobile terminals and other terminals. The network server 24 may connect the mobile terminals with other terminals through the Internet 30.

The Internet 30 is a wide area network that connects hundreds of thousands of computers and smaller sub-networks world-wide. Businesses, government bodies and entities, educational organizations, and even individuals publish information or data organized in the form of websites. A website may comprise multiple web pages that display a specific set of information and may contain links to other web pages with related or additional information. Each web page is identified by a Uniform Resource Locator (URL) that includes the location or address of the computer that contains the resource to be accessed in addition to the location of the resource on that computer. The type of file or resource depends on the Internet application protocol. For example, the Hypertext Transfer Protocol (HTTP) describes a web page to be accessed with a web browser application. The file accessed may be a simple text file, an image file, an audio file, a video file, an executable, a common gateway interface application, a Java applet, or any other file supported by HTTP. The HyperText Transport Protocol Secure (HTTPS) is the standard encrypted communication mechanism for the Internet. This protocol is generally used by a service provider 6 to achieve a secure communication to the user terminal 4 for transmitting sensitive information such as credit card information or username and password combinations.

Figure 3:
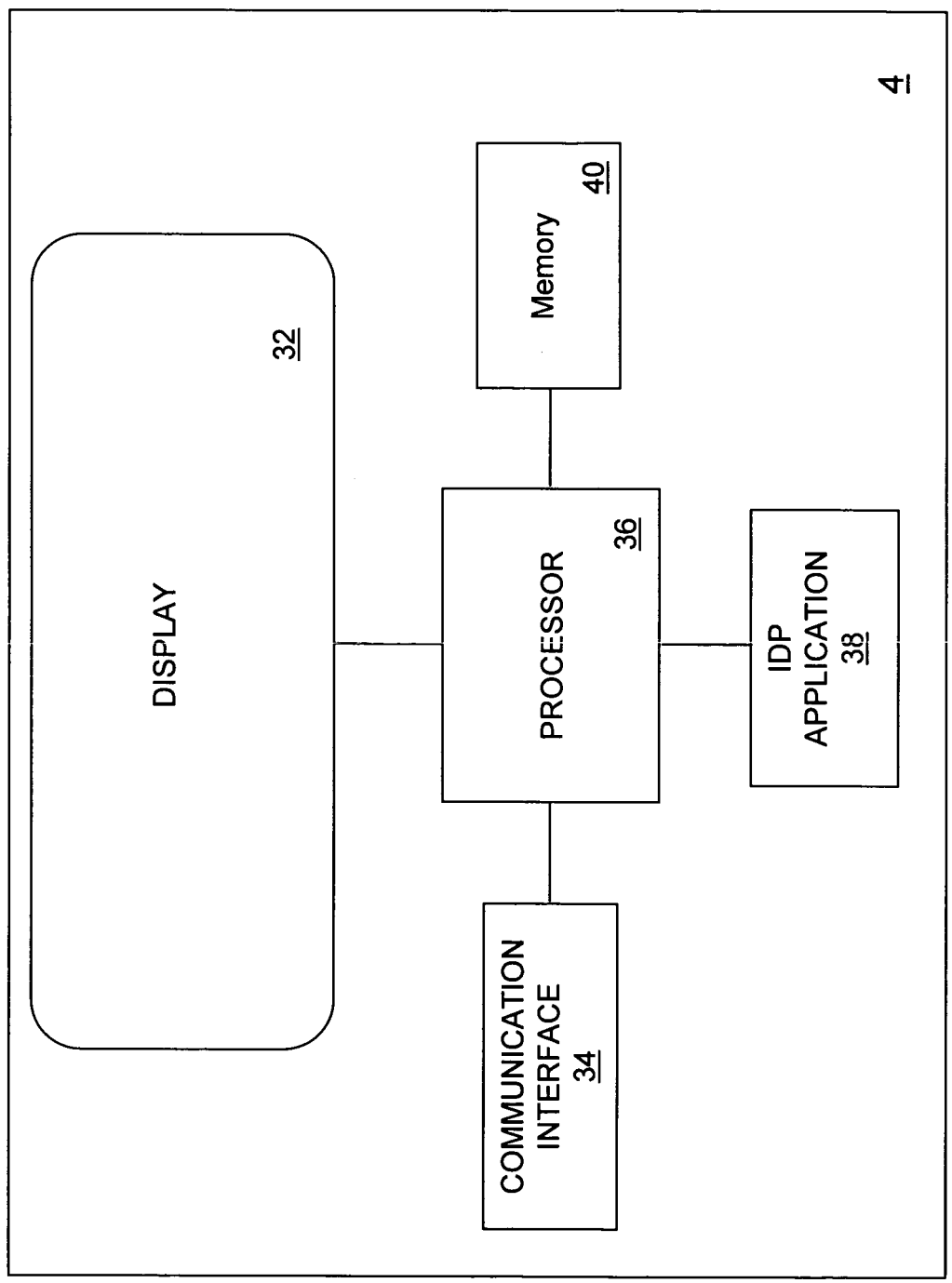
FIG. 3 is an overview diagram of a terminal in accordance with an exemplary embodiment.

In an exemplary embodiment, the terminal 4, as shown in FIG. 3, comprises a display 32, a communication interface 34, a processor 36, an IDP application 38, and a memory 40. The display 32 presents information for display and for editing including information generated by the IDP application 38. The exact architecture of the terminal 4 is not important. Different and additional terminal compatible devices may be incorporated into the terminal 4 and/or the system 2. The display 32 presents IDP application information to the user possibly including a user interface created by an executing IDP application 38. The display 32 can provide IDP application information for services provided by either the service provider or the terminal 4. The display 32 can be a thin film transistor (TFT) display, a light emitting diode (LED) display, a Liquid Crystal Display (LCD), or any of a variety of different displays known to those skilled in the art.

The processor 36 executes instructions from the IDP application 38 in addition to other instructions contained within the processor 36. The IDP application 38 runs in the background automatically. The terminal may have a plurality of processors 36.

An application provides computing devices with the capability to perform a wide variety of tasks including drafting documents, communicating with others, preparing presentations, locating information, etc. The IDP application 38 is an organized set of instructions that, when executed, cause the terminal 4 to behave in a predetermined manner. The instructions may be written using one or more programming languages. High level programming languages include C, C++, Pascal, BASIC, FORTRAN, COBOL, and LISP. The instructions may also be written in low-level languages called assembly languages. The instructions may further be written in scripting languages that do not require assembly and compilation prior to execution. The term "execution" is the process of running an application or the carrying out of the operation called for by an instruction. The processor 36 executes an instruction, meaning that it performs the operations called for by that instruction. The IDP application 38 may be written in a variety of computer languages including, but not limited to high level languages, scripting languages, assembly languages, etc. Additionally, the operations of the IDP application 38 may be carried out by a special purpose computer, logic circuits, or hardware circuits. Thus, the IDP application 38 may be implemented in hardware, firmware, software, or any combination of these methods.

Launching the application generally requires retrieving the executable form of the application from a permanent memory device and copying the executable to a temporary memory device. The temporary memory device is generally some form of random access memory (RAM). The data in RAM is volatile meaning that it remains only as long as the computer is turned on. When the computer is turned off, RAM loses its data. Read only memory (ROM) refers to special memory used to store programs that boot the computer and perform diagnostics. The values stored in ROM are always there, whether the power is on or not. For this reason, it is called non-volatile memory. ROM is most commonly used to store system-level programs that must be available to the computer at all times. Flash memory is a type of constantly-powered nonvolatile memory that can be erased and reprogrammed in units of memory called blocks. Flash memory is a variation of electrically erasable programmable read-only memory (EEPROM) which, unlike flash memory, is erased and rewritten at the byte level, making EEPROM slower to update.

The memory 40 is the electronic holding place for the operating system, IDP application 38, other applications, and data so that the information can be reached quickly by the computer's processor. The terminal may have a plurality of memories 40 using different memory technologies including, but not limited to, RAM, ROM, flash memory, and the like. The memory may include a cache. The cache may include, but is not limited to, a dedicated bank of high-speed memory or a reserved section of regular memory used to improve performance. The cache provides a temporary storage area for instructions and data. Persistent memory includes all memory types that can preserve the data even when the device is shutdown and started again. Thus, persistent memory is non-volatile. The cache is usually in volatile memory while all other data (for example, IDP data, user data, etc.) is stored in persistent or non-volatile memory.

The communication interface 34 provides an interface for receiving and transmitting calls, messages, and any other information communicated across the network 10. Communications between a terminal and the network 10 may be through one or more of the following connection methods, without limitation: a link established according to the Bluetooth Standards and Protocols, an infrared communications link, a wireless communications link, a cellular network link, a physical serial connection, a physical parallel connection, a link established according to the Transmission Control Protocol/Internet Protocol and Standards (TCP/IP), etc. Transferring content to and from the terminal may use one or more of these connection methods. The communication interface 34 may simultaneously support multiple communications with other terminals 4 through the network 10 including identity providers 8 and service providers 6.

Figure 4:
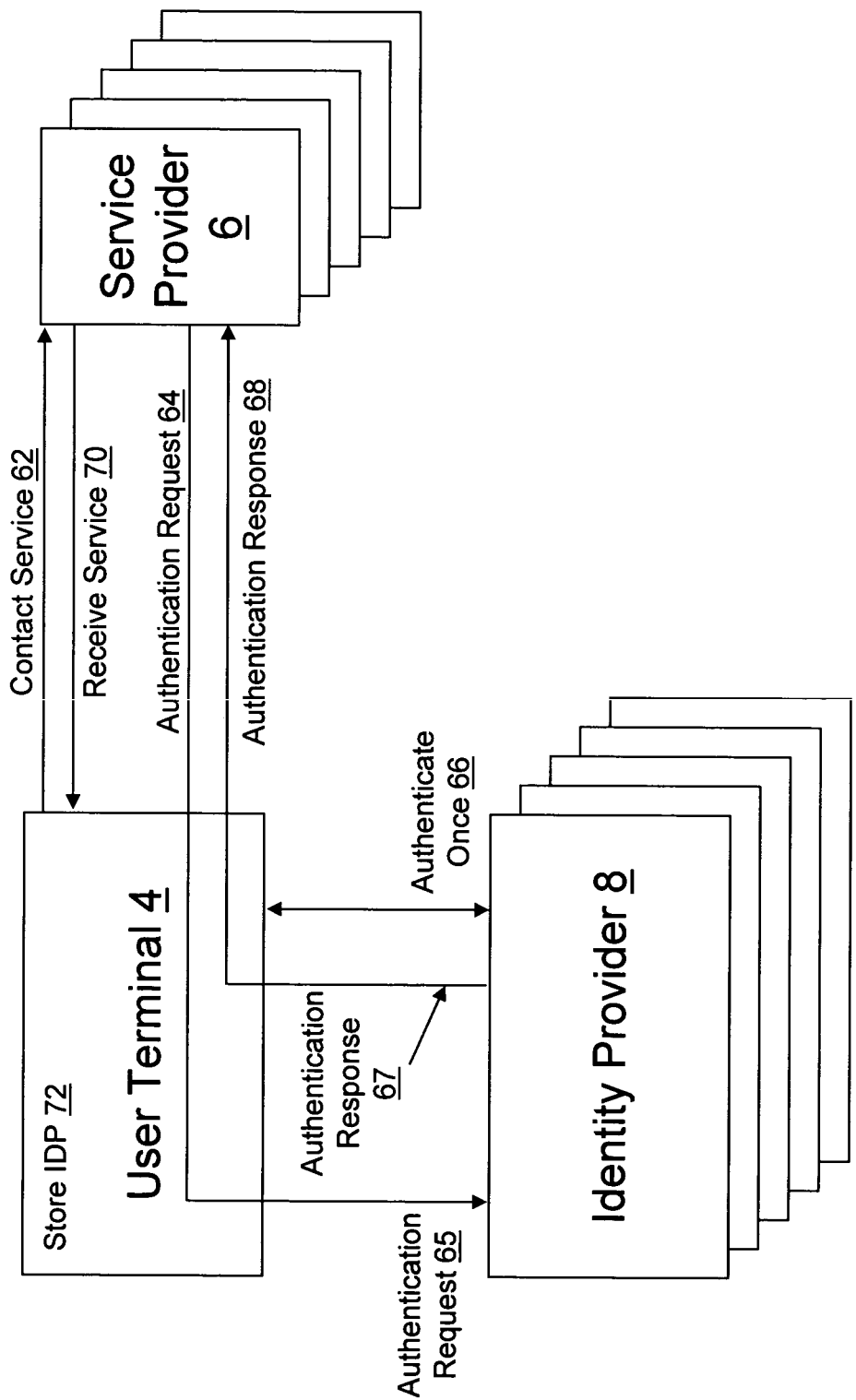
FIG. 4 is a flow diagram depicting operations in a network identity system in accordance with an exemplary embodiment.

With reference to FIG. 4, the user terminal 4 communicates with the service provider 6 and the identity provider 8. The user terminal 4 contacts the service provider 6 for access to a service using the network 10 at operation 62. At operation 64, the service provider 6 sends an authentication request to the user terminal 4 using the network 10. The user terminal 4, at operation 65, sends, using the network 10, the authentication request to the selected identity provider 8 that may have been selected by the user or automatically by the terminal 4 as related below. The identity provider 8 determines if the user terminal 4 has been authenticated previously. If the user terminal 4 has not been authenticated previously, the identity provider 8 requests the authentication information that may include a username and password from the user terminal 4. The user terminal 4 then sends the authentication information to the identity provider 8. If the user terminal 4 has been authenticated previously, authentication is not required again. Thus, authentication at operation 66 may only be required once by the identity provider 8. The identity provider 8, at operation 67, sends the authentication response to the user terminal 4 using the network 10. At operation 68, the user terminal forwards the authentication response to the service provider 6 using the network 10. At operation 70, the user begins receiving the service provided by the service provider 6 if the authentication is successful. At operation 72, if authentication by the identity provider 8 is successful, the identity provider 8 is stored in the memory 40 of the terminal 4. As related previously, the terminal may include multiple memories 40 including a cache. Thus, the identity provider 8 may be stored in multiple memory locations including a cache. In an exemplary embodiment, the identity provider name, the identity provider identifier, the identity provider URL, and the identity provider version number are stored in the memory 40.

Figure 5:
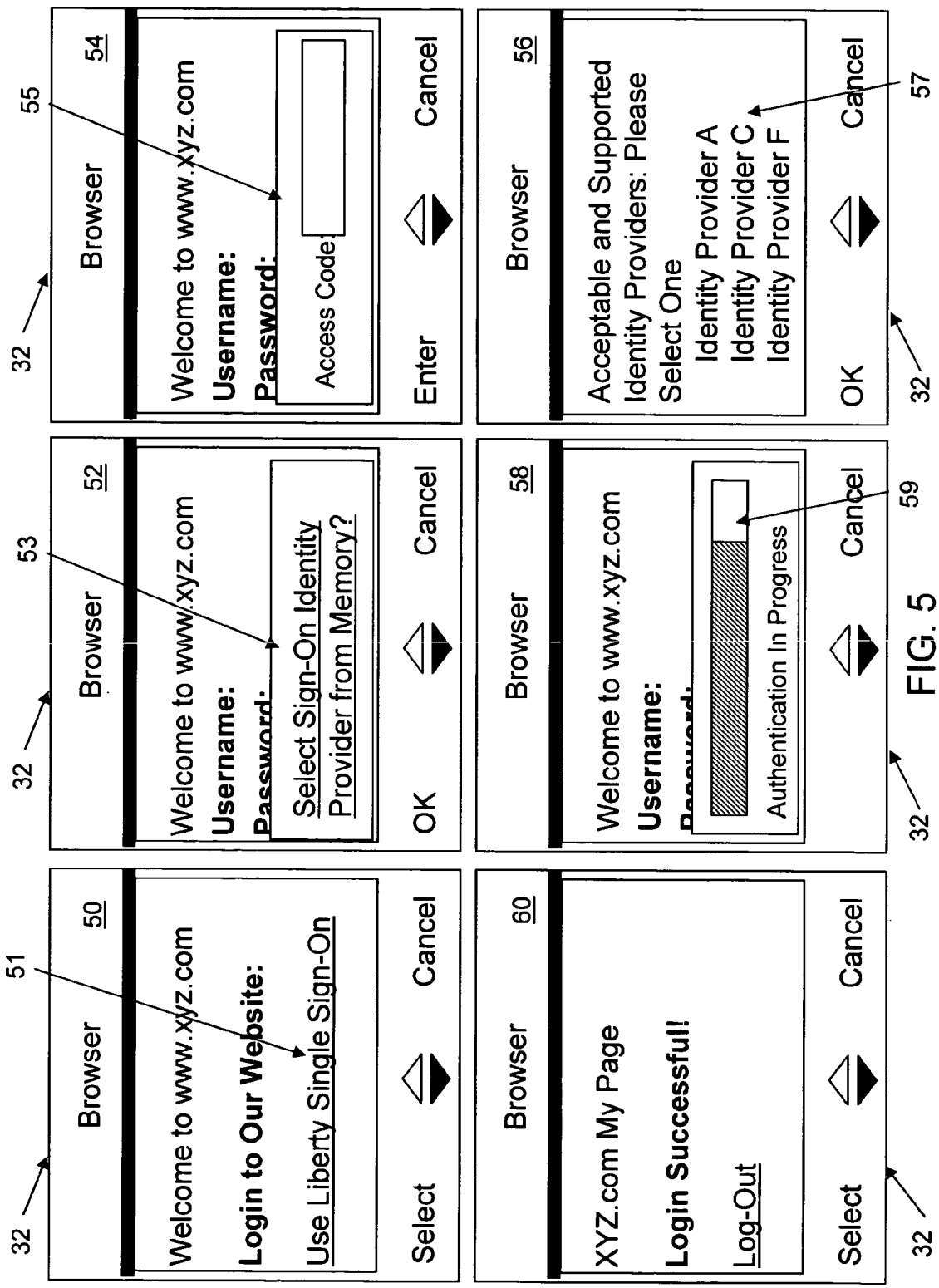
FIG. 5 depicts a sequence of operations at a terminal in a network identity system in accordance with an exemplary embodiment.

With reference to FIG. 5, the display 32 of the user terminal 4 executes an application for browsing the Internet in an exemplary embodiment. Using the network, the user terminal 4 communicates with the service provider located at URL www.xyz.com. At operation 50, the service provider sends an authentication request to the user terminal 4 that includes the option to "Use Single Sign-On" 51. The user may select this option using selection means provided on the terminal keypad. For example, up and down vertical arrows may be used to highlight a selection. The highlighted selection may be selected using the "Select" option and horizontal arrows located on the terminal keypad. Other selection means may be used without deviating from the spirit of the invention. The service provider requests that the user be authenticated before accessing the website, for example, using an assigned username and password. At operation 52, the IDP application 38 detects the authentication request from the service provider and displays a text box requesting if the user of the terminal wants to "Select the Sign-On Identity Provider" 53 or cancel the authentication process. In a preferred embodiment, the user does not manually enter the requested authentication information. The user, however, may manually enter the requested authentication information in alternative embodiments.

The user may select the "Select the Sign-On Identity Provider" 53 option by selecting the "OK" button using horizontal arrows located on the terminal keypad. If the user selects the "OK" option, the IDP application 38 may prompt the user for an "Access Code" 55. The user then enters the access code that the user previously defined for accessing the IDP application. Use of the access code prevents impersonation by an unauthorized user. The user then selects "Enter" by using horizontal arrows located on the terminal keypad.

After entering the correct access code at operation 54, the IDP application compares one or more acceptable identity providers sent by the service provider as part of the authentication request to one or more identity providers that have previously been stored in the memory 40 of the terminal. The stored identity providers are supported by the terminal. In an exemplary embodiment, the IDP application compares the stored identity provider identifier to the identity provider identifier of the each acceptable identity provider sent by the service provider. The IDP application displays a list of identity providers that are both acceptable by the service provider and are supported by the terminal at operation 56. The user may select a particular identity provider using the up and down vertical arrows to highlight the selection and then selecting the "OK" option using horizontal arrows located on the terminal keypad. At operation 58, the IDP application sends the authentication request from the terminal to the selected identity provider using operations 65-68 as shown in FIG. 4. At operation 60, the service provider sends a "Login Successful" message to notify the user of the terminal that the services provided by the service provider are available.

In some cases, a service provider sends an authentication request wherein user intervention is not allowed. As a result, the user can not select the IDP to use in responding to the authentication request. In an exemplary embodiment, the IDP application 38 allows the user to select a default identity provider from the list of supported identity providers. Where an authentication request received at terminal 4 does not allow user intervention, the IDP application compares the default identity provider to the one or more acceptable identity providers sent by the service provider as part of the authentication request. If one of the acceptable identity providers matches the default identity provider supported by the terminal 4, the terminal 4 sends the authentication request to the default identity provider using the network 10.

In a preferred embodiment, if the default identity provider does not match one of the acceptable identity providers, the IDP application successively compares each IDP stored in the cache to the one or more acceptable identity providers sent by the service provider as part of the authentication request. If one of the acceptable identity providers matches an IDP stored in the cache, the terminal 4 sends the authentication request to the IDP stored in the cache using the network 10. If none of the IDPs stored in the cache match the one or more acceptable identity providers, the terminal 4 sends the authentication request to the default identity provider using the network 10. If the service provider does not accept the subsequent response from any of the identity providers stored in the memory 40, the terminal 4 sends an error message to the service provider stating than no acceptable IDP is supported. Alternative embodiments may include additional procedures, may execute the procedures in a different order, and/or may not execute each of the procedures just related when no match is found between the default identity provider supported by the terminal 4 and the one or more acceptable identity providers.

In an exemplary embodiment, the IDP application 38 at the terminal 4 receives the authentication request from the service provider 6 at operation 64. The IDP application 38 compares one or more acceptable identity providers sent by the service provider with one or more supported identity providers stored in the cache. If one of the acceptable identity providers matches a supported identity provider stored in the cache, the terminal 4 sends the authentication request to the supported identity provider using the network 10 without intervention by the user. If no match between acceptable identity providers and supported identity providers is found, processing may continue as related previously at operation 52.

It is understood that the invention is not confined to the particular embodiments set forth herein as illustrative, but embraces all such modifications, combinations, and permutations as come within the scope of the following claims. The present invention is not limited to a particular operating environment. Those skilled in the art will recognize that the system and methods of the present invention may be advantageously operated on different platforms. Thus, the description of the exemplary embodiments is for purposes of illustration and not limitation.

What is claimed is:

1. A method comprising:
  receiving a first authentication request from a service provider at a terminal, wherein the first authentication request identifies a first acceptable identity provider;
  receiving first user input comprising an identity provider application access code;
  subsequent to receiving the first user input, comparing, by the terminal, the first acceptable identity provider with a supported identity provider;
  determining that the first acceptable identity provider matches the supported identity provider;
  displaying, by the terminal, the first acceptable identity provider;
  receiving second user input comprising a selection of the first acceptable identity provider;
  sending the first authentication request from the terminal to the first acceptable identity provider;
  receiving a second authentication request at the terminal, wherein the second authentication request identifies a second acceptable identity provider;
  subsequent to receiving the second authentication request, comparing, by the terminal, the second acceptable identity provider with the supported identity provider;
  determining that the second acceptable identity provider does not match the supported identity provider; and
  sending the second authentication request from the terminal to the second acceptable identity provider.

2. The method of claim 1, further comprising storing the supported identity provider in a cache of the terminal.

3. The method of claim 1, wherein the supported identity provider comprises a default identity provider.

4. The method of claim 3, further comprising selecting the default identity provider.

5. The method of claim 1, further comprising:
  sending an authentication response from the terminal to the service provider.

6. The method of claim 5, further comprising:
  receiving, by the terminal, the authentication response from the first acceptable identity provider; and
  storing, by the terminal, data identifying the first acceptable identity provider responsive to receiving the authentication response at the terminal.

7. A non-transitory computer-readable medium comprising executable instructions that, when executed, cause a device at least to:
  receive a first authentication request from a service provider, wherein the first authentication request identifies a first acceptable identity provider;
  receive first user input comprising an identity provider application access code;
  subsequent to receiving the first user input, compare the first acceptable identity provider with a supported identity provider;
  determine that the first acceptable identity provider matches the supported identity provider;
  display the first acceptable identity provider;
  receive second user input comprising a selection of the first acceptable identity provider;
  send the first authentication request to the first acceptable identity provider;

receive a second authentication request, wherein the second authentication request identifies a second acceptable identity provider;

subsequent to receiving the second authentication request, compare the second acceptable identity provider with the supported identity provider;

determine that the second acceptable identity provider does not match the supported identity provider; and send the second authentication request to the second acceptable identity provider.

8. The non-transitory computer-readable medium of claim 7, wherein the supported identity provider comprises a default identity provider.

9. The non-transitory computer-readable medium of claim 8, wherein the executable instructions, when executed, further cause the device to select the default identity provider.

10. The non-transitory computer-readable medium of claim 7, wherein the executable instructions, when executed, further cause the device to:

receive an authentication response from the first acceptable identity provider; and send the authentication response to the service provider.

11. The non-transitory computer-readable medium of claim 10, wherein the executable instructions, when executed, further cause the device to store data identifying the first acceptable identity provider responsive to receiving the authentication response.

12. An apparatus comprising:

a processor; and memory storing executable instructions configured to, with the processor, cause the apparatus at least to:

receive a first authentication request from a service provider, wherein the first authentication request identifies a first acceptable identity provider;

receive first user input comprising an identity provider application access code;

after receiving the first user input, compare the first acceptable identity provider with a supported identity provider;

determine that the first acceptable identity provider matches the supported identity provider;

display the first acceptable identity provider;

receive second user input comprising a selection of the first acceptable identity provider;

send the first authentication request to the first acceptable identity provider;

receive a second authentication request, wherein the second authentication request identifies a second acceptable identity provider;

subsequent to receiving the second authentication request, compare the second acceptable identity provider with the supported identity provider;

determine that the second acceptable identity provider does not match the supported identity provider; and send the second authentication request to the second acceptable identity provider.

13. The apparatus of claim 12, wherein the executable instructions are further configured to, with the processor, cause the apparatus to store the first acceptable identity provider.

14. The apparatus of claim 12, wherein the supported identity provider comprises a default identity provider.

15. The apparatus of claim 14, wherein the executable instructions are further configured to, with the processor, cause the apparatus to select the default identity provider.

16. The apparatus of claim 12, wherein the executable instructions are further configured to, with the processor, cause the apparatus to:

receive an authentication response from the first acceptable identity provider; and send the authentication response to the service provider.

17. The apparatus of claim 16, wherein the executable instructions are further configured to, with the processor, cause the apparatus to store the first acceptable identity provider responsive to receiving the authentication response.

* * * * *